April 23, 1940.                    S. A. SNELL                    2,198,394
                              SEAT POST ASSEMBLY
                              Filed Sept. 13, 1937
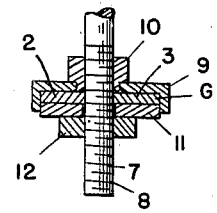
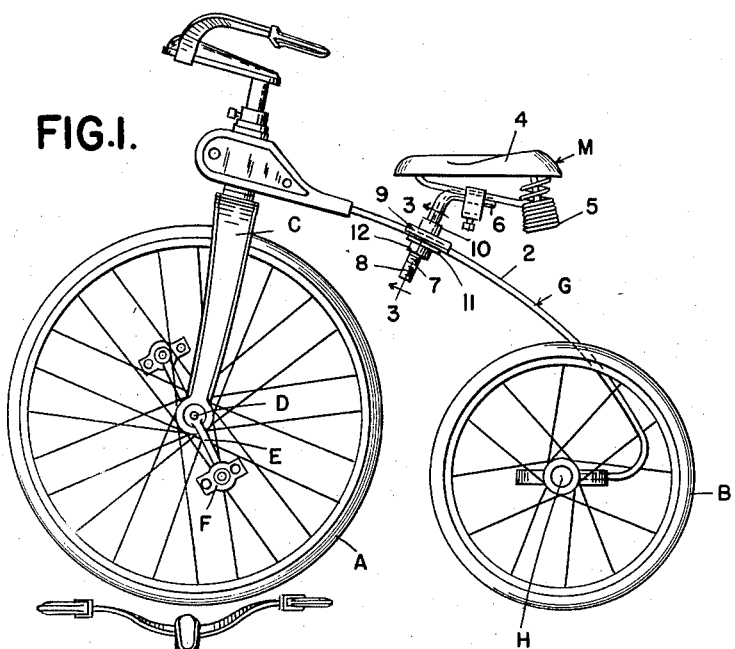
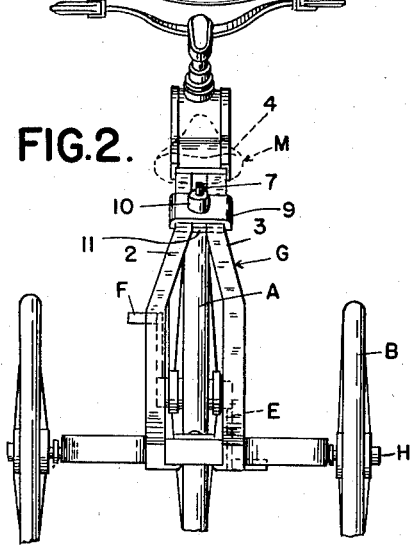
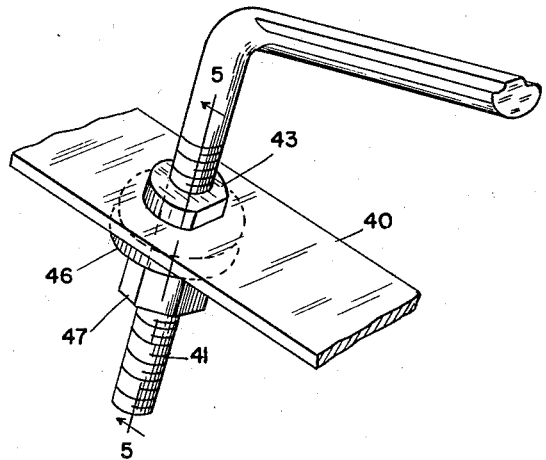
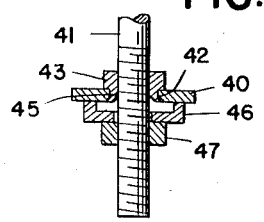
INVENTOR
SAMUEL A. SNELL
BY
*Whittemore, Hulbert & Belknap*
ATTORNEYS Patented Apr. 23, 1940

2,198,394

UNITED STATES PATENT OFFICE 2,198,394

SEAT POST ASSEMBLY

Samuel A. Snell, Toledo, Ohio, assignor to The American-National Company, Toledo, Ohio, a corporation of Ohio Application September 13, 1937, Serial No. 163,670

8 Claims. (Cl. 155—5.24)

This invention relates generally to saddle mountings for use with juvenile vehicles such as velocipedes, bicycles, and the like and constitutes a continuation-in-part of my application filed July 12, 1937, bearing Serial No. 153,143.

One of the essential objects of the invention is to provide a saddle mounting of this type wherein provision is made for adjusting the saddle lengthwise of the backbone as well as in a direction at substantially right angles thereto so that the rider may be positioned correctly relative to the pedals of the vehicle.

Another object is to provide a mounting wherein the saddle may be effectively held against movement in either of the two directions mentioned relative to the backbone by the clamping action of a single nut on the supporting post for the saddle.

Other objects, advantages and novel details of construction of this invention will be made more apparent as this description proceeds, especially when considered in connection with the accompanying drawing, wherein:

Figure 1 is a side elevation of a velocipede provided with a saddle mounting embodying my invention;

Figure 2 is a rear elevation of the velocipede;

Figure 3 is a vertical sectional view taken substantially on the line 3—3 of Figure 1;

Figure 4 is a fragmentary perspective view of a slightly modified construction;

Figure 5 is a vertical sectional view taken substantially on the line 5—5 of Figure 4.

Referring now to the drawing, A is the front wheel, B is the rear wheel, and C is the front fork straddling the front wheel and having an upwardly extending tubular shank 1. D is an axle for the front wheel journaled in the furcations of the fork C and provided at its opposite ends with cranks E and pedals F. G is the backbone having a pair of laterally spaced strips 2 and 3 of spring steel that are terminally connected to the shank 1 of the front fork and to the axle H for the rear wheel B.

The saddle M is movable lengthwise of the backbone G and is also movable in a direction at substantially right angles thereto to position the rider properly relative to the pedals F. As shown, the saddle M has a seat 4 provided with spring structure 5 mounted on a substantially horizontal arm 6 of a supporting post 7. In the present instance the post 7 is provided at its lower end with exterior threads 8 and extends downwardly between the strips 2 and 3 of the backbone. For carrying this post 7 there is a flanged bracket 9 slidable on the backbone and having an interiorly threaded bushing 10 receiving the post 7 and engaging the threads 8 thereof. A cooperating plate 11 is sleeved on the post beneath the backbone G, and a nut 12 threadedly engages the post 7 beneath the plate 11. Thus, when the nut 12 is loosened, the bracket 9 and plate 11 assembly may be moved along the backbone G to the desired position and/or the post 7 may be revolved in the bushing 10 to raise and lower the seat 4 relative to the backbone G. When the nut 12 is tightened, the saddle M will be effectively held against both sliding and rotary movements.

In Figures 4 and 5 I have illustrated a slight modification in which the backbone 40 comprises a single strip of spring steel instead of the laterally spaced strips such as 2 and 3, and the supporting post 41 for the seat extends downwardly through a hole 42 in this backbone. Preferably the bushing 43 threadedly engaging the post 41 is on top of the backbone 40 over the hole 42 and has a depending tubular portion 45 that extends through and has its lower edges upset against the lower edges of said hole. A flanged clamping plate 46 is sleeved upon the post 41 beneath the backbone and a clamping nut 47 threadedly engages the post beneath the plate 46. Thus, when the nut 47 is loosened, the post 41 may be revolved in the bushing 43 to raise and lower the seat relative to the backbone 40. When the nut 47 is tightened, the seat will be effectively held against turning movement. In this connection it will of course be apparent that a mounting of this type may be employed with any single strip, bar, rod or tube type of backbone.

What I claim as my invention is:

1. In a saddle mounting, a backbone, a member embracing said backbone and slidable lengthwise thereof, a bushing rigidly carried by said member, a seat post threadedly engaging said bushing to be vertically adjustable therein, and clamping means carried by said post for holding said member and post in adjusted position.

2. In a saddle mounting, a backbone having laterally spaced portions, a member embracing said backbone to be longitudinally adjustable thereon, said member being provided with an internally threaded portion, a threaded seat post engaging the threaded portion of said member and extending between the spaced portions of said backbone, and a clamping nut engaging the lower portion of said post, whereby said post may be vertically adjusted in said member and together with said nut forms a clamping means for securing said member to said backbone.

3. In a saddle mounting, a backbone formed of a pair of laterally spaced strips, a member embracing said strips to be longitudinally adjustable thereon, a seat post extending between said strips and threadedly engaging said member to be vertically adjustable therein, and a clamping nut engaging the threaded portion of said post.

4. In a saddle mounting, a backbone, a bracket slidable upon the backbone, an interiorly threaded bushing anchored in said bracket, a seat post having exterior threads engaging the interiorly threaded bushing and rotatable therein, a cooperating plate sleeved on said post beneath said backbone, and a nut threadedly engaging the post beneath said plate, the arrangement being such that said nut cooperates with said bracket, post and plate to hold said parts against movement longitudinally of the said backbone and cooperates with said plate and post to hold the latter against turning movement.

5. In a saddle mounting, a backbone comprising a pair of laterally spaced elongated frame members, a bracket slidable upon the backbone and having an opening registering with the space between said laterally spaced frame members, an interiorly threaded bushing anchored in said bushing, a seat post having exterior threads engaging the interiorly threaded bushing and rotatable therein, a plate sleeved on said post beneath said backbone, and a nut threadedly engaging the post beneath said plate, the arrangement being such that said nut cooperates with said bracket, post and plate to hold said parts against movement longitudinally of said backbone and cooperates with said plate and post to hold the latter against turning movement.

6. In a saddle mounting, a backbone, a member embracing said backbone and adjustable longitudinally thereof, a bushing carried by said member, a seat post adjustable in said bushing, a member sleeved on said post beneath said backbone, and a clamping element adjustable on said post beneath and engageable with said sleeved member.

7. In a saddle mounting, a backbone having a pair of laterally spaced portions, a member embracing said portions and adjustable longitudinally thereof, a seat post between said portions and adjustable in said member, a cooperating member sleeved on said post beneath said spaced portions within the embrace of the member aforesaid, and a clamping member adjustable on said post beneath and engageable with said cooperating member.

8. In a saddle mounting, a backbone, a bracket slidable upon said backbone, a bushing fixed to said bracket, a seat post adjustable in said bushing, a clamping plate sleeved on said post beneath said backbone and engageable with the latter, and a nut adjustable on the post beneath said plate, the arrangement being such that said nut cooperates with said bracket, post and plate to hold said parts against sliding movement on the backbone and cooperates with said plate and post to hold the latter against turning movement.

SAMUEL A. SNELL.